United States Patent [19]

Bruno et al.

[11] Patent Number: 5,116,790
[45] Date of Patent: May 26, 1992

[54] COG DIELECTRIC WITH HIGH K

[75] Inventors: Salvatore A. Bruno, Wilmington; Ian Burn, Hockessin, both of Del.

[73] Assignee: E. I. Du Pont de Nemours and Company, Wilmington, Del.

[21] Appl. No.: 614,550

[22] Filed: Nov. 16, 1990

[51] Int. Cl.$^5$ .............................. C04B 35/49
[52] U.S. Cl. .................... 501/139; 501/137; 501/138; 361/321
[58] Field of Search ........... 501/137, 138, 139; 428/699; 361/321 CC

[56] References Cited

U.S. PATENT DOCUMENTS

| | | | |
|---|---|---|---|
| 4,500,942 | 2/1985 | Wilson | 361/320 |
| 4,522,927 | 6/1985 | Koshima | 501/139 |
| 4,535,064 | 8/1985 | Yoneda | 501/139 X |
| 4,713,726 | 12/1987 | Sasazawa | 361/321 |
| 4,753,906 | 6/1988 | Nishigaki et al. | 501/139 |
| 4,757,037 | 7/1988 | Columbet et al. | 501/134 |
| 4,855,266 | 8/1989 | Burn | 501/138 |
| 4,866,017 | 9/1989 | Okawa | 501/139 |

*Primary Examiner*—William R. Dixon, Jr.
*Assistant Examiner*—Leo M. Schull

[57] ABSTRACT

A composition consisting essentially of 60.0–70.0 mol % $TiO_2$, 14.3–20.0 mol % $Nd_2O_3$, 11.0–16.7 mol % BaO, 1.0–8.0 mol % $ZrO_2$ and 0.05–0.30 mol % $CeO_2$. This composition is useful for forming densified ceramic dielectric bodies having a dielectric constant of at least 65 and which meet COG specifications, and multilayer capacitors that contain such dielectric bodies.

7 Claims, No Drawings

COG DIELECTRIC WITH HIGH K

FIELD OF THE INVENTION

The invention is related to a dielectric composition. More particularly, the invention is related to a dielectric composition with good temperature stability and high dielectric constant, for use in multilayer devices such as capacitors.

BACKGROUND OF THE INVENTION

Barium-neodymium-titanate has been widely used a basis for multilayer capacitor (MLC) dielectrics with COG temperature dependence since 1968, when Bolton and Muhlstadt at the University of Illinois (Ph.D and M.S. Thesis, respectively) discovered that this material combined a relatively high dielectric constant with good temperature stability. Since then, various workers have attempted to identify the composition of the primary phase in this material, with little agreement. Suggested compositions, and the date of publication, are summarized below:

|  | BaO | Mol % $Nd_2O_3$ | $TiO_2$ |
| --- | --- | --- | --- |
| $BaO.Nd_2O_3.3TiO_2$ (1981) | 20.0 | 20.0 | 60.0 |
| $BaO.Nd_2O_3.5TiO_2$ (1981) | 14.3 | 14.3 | 71.4 |
| $BaO.Nd_2O_3.4TiO_2$ (1984) | 16.7 | 16.7 | 66.7 |
| $15BaO.19Nd_2O_3.72TiO_2$ (1984) | 14.2 | 17.9 | 67.9 |
| $4BaO.5Nd_2O_3.18TiO_2$ (1986) | 14.8 | 18.5 | 66.7 |

Part of the difficulty in obtaining agreement is that the barium-neodymium-titanate was made by calcining a mechanical mixture of powdered ingredients. Generally, the neodymium oxide that is available commercially has a particle size greater than 10 microns and is difficult to mill to a fine powder, so the degree of reaction with the other ingredients can be variable. One would expect that this problem could be minimized if the compound were made by chemical synthesis, for example by the method described by Colombet and Magnier in U.S. Pat. No. 4,757,037 which issued in 1988. In the work of Colombet and Magnier, a barium-neodymium-titanate of nominal composition $BaO.Nd_2O_3.3TiO_2$ was reported to have been made by co-precipitation, after mixing a solution of barium and neodymium nitrates with a titania sol. However, this composition lacked the required temperature stability.

It is usually not possible to achieve the requisite temperature stability with the barium-neodymium-titanate system unless the composition is modified with additives. For example, Kashima and Tomuro, in U.S. Pat. No. 4,522,927 which issued in 1985, describe changes in the Temperature Coefficient of Capacitance (TCC) produced by replacing titanium oxide with zirconium oxide according to the formula:

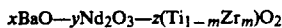

where $x+y+z=1.00$, and $0.05<m<0.25$. Small additions of $MnO_2$, $Cr_2O_3$, FeO, NiO or CoO are also suggested. Despite the beneficial effect on TCC of replacing some titanium oxide with zirconium oxide, the compositions disclosed by Kashima and Tomuro was found to yield dielectrics with low insulation resistance at 125° C.

Numerous other modifications to the barium-neodymium-titanate system are described in the prior art but they typically involve the use of bismuth oxide and/or lead oxide. (See, for example, U.S. Pat. No. 4,866,017). Bismuth oxide can react adversely with Pd electrodes in MLC's, and the processing of powders containing lead oxide can introduce health and environmental concerns. Partial substitution of neodymium oxide with samarium oxide ($Sm_2O_3$) or praseodymium oxide ($Pr_6O_{11}$) has also been suggested as a means of adjusting the TCC (e.g., U.S. Pat. No. 4,500,942).

PRIOR ART

U.S. Pat. No. 4,866,017 (Okawa)

Compositions are described in the system $xBaO.yNd_2O_3.zTiO_2.wBi_2O_3$ with $0.141<x<0.157$, $0.141<y<0.157$, $0.656<z<0.663$, and $0.025<w<0.060$.

U.S. Pat. No. 4,757,037 (Columbet et al)

Fine powders of neodymium titanate or barium-neodymium-titanate are disclosed. These powders are formed by mixing a solution of neodymium nitrate or a solution of barium and neodymium nitrates with a sol of titania particles having a size from about 10 to about 100 Angstroms in diameter, at a low pH. The co-precipitated powder is calcined at a temperature between 800° and 1300° C.

U.S. Pat. No. 4,753,906 (Nishigaki et al)

Compositions are disclosed of the form $xBaO.yTiO_2.zR_2O_3$ where R is selected from Nd, Sm and La. Ba is partially replaced with ions selected from the group consisting Sr, Ca and Mg. The dielectric compositions may further contain oxides selected from the group consisting of $Cr_2O_3$, $Fe_2O_3$, $WO_3$, $SnO_2$ and $ZrO_2$.

U.S. Pat. No. 4,713,726 (Sasazawa)

Dielectric ceramic compositions are described comprising a mixture of 7-25 mol % $BaTiO_3$, 0.1-15 mol % $Bi_2O_3$, 50-65 mol % $TiO_2$, 0.1-5 mol % $LaO_{3/2}$ and 15-45 mol % $NdO_{3/2}$ in a total of 100 mol %. Also included is at least one member selected from the group consisting of $Y_2O_3$, $Gd_2O_3$ and $CeO_2$, and at least one member selected from the group consisting of $Cr_2O_3$, $MnO_2$, NiO and CoO, in amounts of from 0.1 to 5.0 parts by weight and from 0.01 to 1.0 parts by weight per 100 parts by weight of the mixture, respectively.

U.S. Pat. No. 4,522,927 (Kashima)

Dielectric compositions are disclosed represented by the formula $xBaO.yNd_2O_3.z(Ti_{1-m}Zr_m)O_2$ wherein $x+y+z=1.00$ and m is between 0.05 and 0.25. At least one member selected from the group $MnO_2$, $Cr_2O_3$, FeO, NiO and CoO is added in the amount of 0.05 to 1.00% by weight of the total weight of the main components.

U.S. Pat. No. 4,500,942 (Wilson)

Compositions for NPO class capacitors are disclosed comprising a mixture of BaO, PbO, $Nd_2O_3$, $Bi_2O_3$, $TiO_2$ one of the rare earth oxides selected from the group consisting of $Pr_6O_{11}$ and $Sm_2O_3$.

SUMMARY OF THE INVENTION

It is an object of the invention to provide a dielectric composition free of bismuth, lead and cadmium which can be fired into a dense ceramic body with a dielectric constant (K) of at least 65.

It is another object of the invention to provide a ceramic composition which can meet or exceed the Electrical Industries Association (EIA) specification of COG, sometimes known as NPO:

(1) a temperature coefficient of capacitance (TCC) of not more that $+/-30$ parts per million per °C., with respect to the value at 25° C., over the temperature range $-55°$ to 125° C.;

(2) a dissipation factor (DF) of less than 0.1% at 25° C. when measured at 1 KHz with 1.0 V(rms) applied;

(3) an insulation resistance (IR) of at least 1000 ohm.farads measured at 25° C., and at least 100 ohm.farads when measured at 125° C.

In its primary aspect, the invention is directed to a composition for forming a densified ceramic dielectric body having the above characteristics, the composition consisting essentially of:

(a) 60.0–70.0 mol % $TiO_2$
(b) 14.3–20.0 mol % $Nd_2O_3$
(c) 11.0–16.7 mol % BaO
(d) 1.0–8.0 mol % $ZrO_2$ and
(e) 0.05–0.30 mol % $CeO_2$.

The invention is also directed to a dispersion of the above-described composition in an organic medium which can be cast as a dielectric sheet.

In another aspect, the invention is directed to a dielectric layer made by firing the above-described dielectric sheet to volatilize the organic medium therefrom and to densify the inorganic solids by sintering.

In a further aspect, the invention is directed to a capacitor comprising a plurality of the above-described dielectric layers interspersed with at least two metal electrode layers.

In a still further aspect, the invention is directed to a process for preparing the above-described composition by co-precipitation and calcination.

DETAILED DESCRIPTION OF THE INVENTION

The compositions of the invention can be made by mechanically mixing finely divided powders of each ingredient by conventional means. Alternatively, the compositions can be prepared using neodymium titanate that is made by a liquid-mix process of the invention which comprises chemical co-precipitation then calcination. Preferably, the composition is prepared entirely by chemical co-precipitation and subsequent calcination.

In the mechanical mix process, a mixture of finely divided powders of barium titanate, neodymium titanate, titanium oxide, zirconium oxide, and cerium oxide are used. The average particle size of each powder should be about 1 mm or less, preferably 0.5 to 1.0 mm. Powders of the appropriate size are readily available commercially, except for neodymium titanate. Neodymium titanate ($Nd_2Ti_2O_7$) can be prepared by calcining at about 1100° C. an intimate mixture of neodymium oxide and titanium oxide powders, or precursors. However, as mentioned above, a preferred approach is to use a liquid-mix technique.

The liquid-mix method for preparing neodymium titanate can begin with the step of preparing a solution of metal chelates by first mixing a chelating agent with a solvent. The desired metal compounds are added by stirring and are of the general formula, $MX_n$, wherein M is titanium and neodymium, and X is an anion or a radical selected from $HCO_2-$, $CH_3CO_2-$, $-OH$, $-OR$, $-NO_3$ and $-Cl$ and mixtures thereof, R being an alkyl group; and n is 3 or 4 depending on the valence state of the metal cation $M^{+n}$. Upon adjustment of the pH in the range of about 5 to 10, the chelating agent is capable of forming soluble metal chelates with the metal cations.

The term chelating agent, as described by Cotton and Wilkinson in *Advanced Inorganic Chemistry* (1962), is incorporated herein to refer to "a polydentate ligand whose structures permit the attachment of two or more donor sites to the same metal ion simultaneously, thus closing one or more rings. A ligand is defined as any atom, ion, or molecule capable of functioning as a donor partner in one or more coordinate bonds". Chelating agents useful in practising the invention are alpha-hydroxycarboxylic acids, such as lactic, glycolic, malic and citric acid or alpha-aminocarboxylic acids, such as ethylene diamine tetracetic acid (EDTA) and glycine. A solution of the chelating agent is prepared using a solvent, for example, deionized water or mixtures of deionized water with miscible solvents such as methanol, ethanol, isopropanol and acetic acid. The solvent may optionally contain small amounts of wetting agents or surfactants to facilitate dissolution of the metal compounds. It is important that a sufficient amount of chelating agent be added to produce a clear solution of metal chelates. The desired metal compounds are added to the above chelating agent and solvent by stirring. The pH is adjusted to a value in the range 5 to 10, typically by the addition of a base selected from ammonium hydroxide, tetramethylammonium hydroxide, sodium hydroxide, and potassium hydroxide.

The metal chelate solution, prepared as described above, is mixed with an aqueous solution of a strong base such as, for example, sodium hydroxide, potassium hydroxide, or lithium hydroxide in a high turbulence energy environment as described in co-pending, commonly assigned application, U.S. Ser. No. 07/144,835 and passed, almost simultaneously, to a receiving vessel (known as drown-out vessel). The desired high turbulence energy environment for mixing the metal chelate solution stream and the aqueous basic solution stream can be achieved using a mixing pump, mixing tee or by pumping the ingredient streams through a coaxial jet mixer. Mixing may optionally be accomplished in the presence of a surfactant, such as, for example, Igepal ® CO-890, an ethoxylated alkylphenol surfactant manufactured by GAF Corporation, New York, N.Y. The strong base increases the pH of the mixture to a value above 11 and induces precipitation of the reaction product, which is heated at about 100° C. for several hours to complete the decomposition of the metal chelates. The precipitate is recovered by filtering, washing to remove impurities, and then drying. The dried precipitate is granulated and then calcined at 900° to 1100° C. to crystallize the powder and to reduce the surface area from about 300 $M^2/gm$ to less than 10 $M^2/gm$.

A particularly preferred method of making the composition of the invention is to form the entire composition by a liquid mix technique. A co-precipitated barium-neodymium titanate with added dopants can be prepared by the method described above for neodymium titanate, except that $MX_n$ now includes other M cation such as zirconium and cerium in addition to neodymium and titanium, and the aforementioned aqueous solution of strong base contains barium ions. The barium ions are introduced from water-soluble barium salts selected from the hydroxide, chloride, nitrate, and acetate. If barium hydroxide is used, pH can be adjusted to a value above about 11 by using a small excess of barium hydroxide over the amount needed for stoichiometry in the precipitated product, instead of using an alkali metal hydroxide.

The modified barium neodymium titanate composition of this invention can be formulated into a dielectric green sheet. One method for forming such sheet comprises casting a dispersion of the ceramic modified barium neodymium titanate composition in a solution of polymeric binder and volatile organic solvent onto a flexible substrate, such as a steel belt or polymeric film, and then heating the cast layer to remove the volatile solvent therefrom.

The organic medium in which the ceramic solids are dispersed consists of the polymeric binder which is dissolved in a volatile organic solvent and, optionally, other dissolved materials such as plasticizers, release agents, dispersing agents, stripping agents, antifouling agents and wetting agents.

To obtain better binding efficiency, it is preferred to use at least 5% wt. polymer binder for 95% wt. ceramic solids. However, it is further preferred to use no more than 20% wt. polymer binder in 80% wt. ceramic solids. Within these limits, it is desirable to use the least possible amount of binder vis-a-vis solids in order to reduce the amount of organics which must be removed by pyrolysis.

In the past, various polymeric materials have been employed as the binder for green sheets, e.g., (poly)vinyl butyral, (poly)vinyl acetate, (poly)vinyl alcohol, cellulosic polymers such as methyl cellulose, ethyl cellulose, hydroxyethyl cellulose, methylhydroxy-ethyl cellulose, atactic polypropylene, polyethylene, silicon polymers such as (poly)methyl siloxane, (poly)methylphenyl siloxane, polystyrene, butadiene/styrene copolymer, polystyrene, (poly)vinyl pyrrolidone, polyamides, high molecular weight polyethers, copolymers of ethylene oxide and propylene oxide, polyacrylamides, and various acrylic polymers such as sodium polyacrylate, (poly)lower alkyl acrylates, (poly)lower alkyl methacrylates and various copolymers and multipolymers of lower alkyl acrylates and methacrylates. Copolymers of ethyl methacrylate and methyl acrylate and terpolymers of ethyl acrylate, methyl methacrylate and methacrylic acid have been previously used as binders for slip casting materials.

More recently, Usala, in U.S. Pat. No. 4,613,648 has disclosed an organic binder which is a mixture of compatible multipolymers of 0–100% wt. $C_{1-8}$ alkyl methacrylate, 100–0% wt. $C_{1-8}$ alkyl acrylate and 0–5% wt. ethylenically unsaturated carboxylic acid or amine. Because the polymers permit the use of minimum amounts of binder and maximum amounts of dielectric solids, their use is preferred with the dielectric composition of this invention.

The solvent component of the casting solution is chosen so as to obtain complete solution of the polymer and sufficiently high volatility to enable the solvent to be evaporated from the dispersion by the application of relatively low levels of heat at atmospheric pressure. In addition, the solvent must boil well below the boiling point and decomposition temperature of any other additives contained in the organic medium. Thus, solvents having atmospheric boiling points below 150° C. are used most frequently. Such solvents include acetone, xylene, methanol, ethanol, methyl ethyl ketone, 1,1,1-trichloroethane, tetrachloroethylene, amyl acetate, 2,2,4-triethyl pentandiol-1,3-monoisobutyrate, toluene and methylene chloride.

Frequently, the organic medium will also contain a small amount, relative to the binder polymer, of a plasticizer which serves to lower the glass transition temperature (Tg) of the binder polymer. However, the use of such materials should be minimized in order to reduce the amount of organic materials which must be removed when the films cast therefrom are fired. The choice of plasticizers is, of course, determined primarily by the polymer which must be modified. Among the plasticizers which have been used in various binder systems are diethyl phthalate, dibutyl phthalate, octyl phthalate, butyl benzyl phthalate, alkyl phosphates, polyalkylene glycols, glycerol, (poly)ethylene oxides, hydroxyethylated alkyl phenol, dialkyldithiophosphonate and (poly)isobutylene. Butyl benzyl phthalate is frequently used in acrylic polymer systems because it can be used effectively in relatively small concentrations.

Multilayer devices such as circuits and capacitors can be fabricated from green dielectric sheets and electrically conductive metallizations. For example, a metallization can be printed in the desired pattern upon a green sheet. The printed sheets are stacked, laminated and cut to form the desired structures. The green assemblage is then fired to effect removal of the organic medium from the metallization material and of the organic binder from the dielectric material. The removal of these materials is accomplished by a combination of evaporation and thermal decomposition during the firing operation. In some instances, it may also be desirable to interpose a preliminary drying step prior to firing. Conventionally, the thickness of an unfired dielectric sheet is typically about 18–30 microns and upon firing the thickness becomes about 15–25 microns. The present invention, however, allows sheets of thicknesses as small as 10 microns or less to be used.

The desired sintering temperature is determined by the physical and chemical characteristics of the dielectric material. Ordinarily the sintering temperature will be chosen to obtain maximum densification of the dielectric material. However, it will be recognized by those skilled in the art of fabricating electrical devices that maximum densification is not always needed. Therefore, the term "sintering temperature" refers to the temperature (and implicity the amount of time as well) to obtain the desired degree of densification of the dielectric material for the particular application. The compositions of the invention sinter to dense ceramic materials at a temperature of about 1240°–1320° C.

Sintering times also vary with the dielectric composition but ordinarily about 2.5 hours at the sintering temperature is preferred. Upon completion of sintering, the rate of cooling to ambient temperature is carefully controlled in accordance with resistance of the compounds to thermal shock.

In one embodiment of the invention, modified barium neodymium titanate compositions are formulated into dielectric sheets which are formed into monolithic capacitors. A preferred method for forming such a monolithic capacitor comprises the sequential steps of (1) forming a green dielectric sheet from the above-described composition and an organic binder; (2) applying a layer of conductive electrode material dispersed in an organic medium to each of a plurality of the green sheets; (3) forming an assemblage of alternating layers of green sheets and electrode material; and (4) firing the assemblage at a temperature above 1240° C. to remove the organic medium and organic binder therefrom and to sinter the conductive electrode material and the dielectric material. A monolithic capacitor formed in this manner comprises a ceramic dielectric body having a dielectric constant of at least 65 and which meets COG specifications and at least two spaced metal electrodes in contact with the ceramic body.

EXAMPLES

EXAMPLE 1

Neodymium titanate ($Nd_2O_3.2TiO_2$) was prepared as follows. Neodymium acetate tetrahydrate (169.7 g, 0.50 mole) and Tyzor®-LA (290.3 g, 0.50 mole) were charged to a 500 ml flask under a nitrogen atmosphere. Tyzor®-LA is a 50% aqueous solution of the lactic acid ammonium salt of chelated titanium manufactured by E.I. du Pont de Nemours and Co., Wilmington, Del. ("Du Pont Co."). The charge was heated to reflux (99° C.) and maintained at reflux for about 30 mins. The temperature of the violet-colored solution was then adjusted to 80°-85° C.

Into a 4100 ml polypropylene reactor was charged 2200 ml of de-ionized water. Carbon dioxide was removed from the water by sparging with nitrogen at about 70° C. for 1 hour. Potassium hydroxide pellets (258 g, 87% KOH, 4.0 moles) were added to the hot de-gassed water and the temperature of the charge adjusted to about 85° C.

By means of a peristaltic pump, an amount (about 6%) of the total available potassium hydroxide was pumped through a jet mixer in advance of the solution of neodymium acetate in Tyzor®-LA. The jet mixer used in this preparation was a coaxial jet mixer like that described in copending, commonly assigned U.S. Application Ser. No. 07/144,835. Without interrupting the flow of the hot potassium hydroxide solution, the remainder of the potassium hydroxide solution was pumped simultaneously with the hot solution of neodymium acetate in Tyzor®-LA over about 1 minute through the jet mixer into a 4100 ml polypropylene reactor (drown-out vessel) containing 400 ml of de-ionized water and 5 g Igepal® CO-890. The drown-out vessel was equipped with an 11.5 cm crescent-shaped Teflon® agitator blade, and the agitator speed was set at 445 rpm during the drown-out procedure. Teflon® is a polytetrafluoroethylene manufactured by the Du Pont Co.

The light blue slurry was heated under reflux (101° C.) for 4 hours. After cooling to about 25° C., the slurry was filtered and the filter cake washed with 16 liters of de-ionized water. It was then dried in a vacuum oven (110°-120° C.) and ground to give 130.3 g of a light blue powder with surface area of 276.4 $M^2/g$. The composition calculated as metal oxides was shown by inductively coupled plasma analysis (I.C.P.) to be as follows: 60.2% $Nd_2O_3$, 30.2% $TiO_2$, and <0.01% $K_2O$. Theoretical amounts for $Nd_2Ti_2O_7$ are 67.82% $Nd_2O_3$ and 32.2% $TiO_2$. The loss on ignition (LOI) of a 3-5 gm sample of the powder heated at 1050° C. for 3 hours was 10.03%. After the ignition loss test, the powder was found to be crystalline neodymium titanate by X-ray diffraction.

This powder was calcined at 900° C. for 5 hours. A ceramic slurry was prepared from 25.00 gms of neodymium titanate, 9.28 gms of barium titanate and 4.02 gms of titanium oxide in 26.0 gms of 1-1-1 trichloroethane and 1.20 gms of AB1015 surfactant (Du Pont Co.). The surfactant used was a low molecular weight acrylic polymer in an organic solvent. The barium titanate and titanium oxide powders had an average particle size less than 1 micron and they were blended with the neodymium titanate by milling in a ball mill with zirconia media. The ceramic mixture had a nominal composition of 15BaO.19$Nd_2O_3$.72$TiO_2$. After milling for 16 hours, 7.0 gms of binder solution was added and the slurry milled for a further hour. The binder solution was a mixture of 91.7% acrylic resin in MEK (5200 binder, Du Pont Co.) and 8.3% butyl benzyl pthalate plasticizer.

Ceramic tape was made from the slurry using a standard doctor-blade technique and then MLC's (EIA size 1206) were assembled with six internal electrodes and five active layers, each about 19 microns thick when fired. A Pd electrode paste (e.g. Du Pont 4820D) was used for printing the electrodes. The capacitors were heated slowly to 550° C. to remove the organic binders and then the MLC's were fired at 1300° C. for 2.5 hours in zirconia sand. The parts were terminated with a standard Ag paste (e.g. Du Pont 4506) for electrical testing. Average capacitance measured at 1 KHz was 586 pF and dissipation factor was 0.001%. The calculated dielectric constant was 75. TCC was −39.6 ppm per °C. at −55° C. and −35.3 ppm per °C. at 125° C., i.e. outside the requirements for COG capacitors. Insulation resistance averaged 11,000 ohm.farads at 25° C. but was only 8 ohm.farads at 125° C., this latter value being below COG requirements.

EXAMPLE 2

Capacitors were made in a similar manner to those in Example 1 except that the amount of barium titanate was reduced from 9.28 to 7.05 gms (i.e. 24.0%). Capacitance was 627 pF, dissipation factor was <0.001% and the calculated dielectric constant was 72. TCC was −43.6 ppm per °C. at −55° C. and −34.0 ppm per °C. at 125° C., again outside the limits for COG capacitors. Insulation resistance was 15,000 ohm.farads at 25° C. and averaged 10 ohm farads at 125° C., again below the requirements at 125° C.

EXAMPLE 3

Neodymium titanate was made by a process similar to that described in Example 1 except that 178.9 g (0.527 mole) of neodymium acetate tetrahydrate was used instead of 169.7 g (0.50 mole). ICP analysis of the dried powder before ignition loss gave 65.04% $Nd_2O_3$, 27.46% $TiO_2$, and <0.01% $K_2O$. The surface area was 271.4 $M^2/g$.

Capacitors were made in a similar manner to those of Example 2 except that only 2.55 gms of $TiO_2$ were used and 2.45 gms of zirconium oxide powder were added. Also, 0.08 gms of manganese carbonate (0.22 wt %) was included. Average capacitance was 484 pF, dissipation factor was 0.005% and the calculated dielectric constant was 67. TCC was −2.9 ppm per °C. at −55° C. and −5.5 ppm per °C. at 125° C., i.e. well within the COG requirements. Insulation resistance averaged 27,000 ohm.farads at 25° C. and 59 ohm.farads at 125° C. Insulation resistance at 125° C. was still below the requirements at 125° C. was not improved by lowering the manganese carbonate from an 0.08 gm addition to 0.025 gms (0.067 wt % of the total composition).

EXAMPLE 4

Capacitors were made in a similar manner to those of Example 3, except that 8.17 gms of barium titanate was used instead of 7.05 gms, and 0.090 gms of cerium oxide (0.24 wt %) was added instead of the manganese carbonate. Average capacitance was 598 pF, dissipation factor was 0.007% and the calculated dielectric constant was 74. TCC averaged −7.0 to −7.1 ppm per °C. from −55° C. to 125° C., again well within the COG requirements. Insulation resistance was 15,000 ohm.farads at 25° C. and was 340 ohm.farads at 125° C. Thus, the addition of cerium oxide was found to provide good insulation resistance at 125° C., well within the COG requirements.

EXAMPLE 5

A composition similar to that described in Example 4 was made by co-precipitation by the following method. The nominal composition was (in wt %) 44.44% $Nd_2O_3$, 34.83% $TiO_2$, 14.08% BaO, 6.42% $ZrO_2$, and 0.24% $CeO_2$. The composition in moles is included in Table 1. Glacial acetic acid (20.0g) and 32.0 g (0.3126 mole) of 88% lactic acid were charged to a 500 ml flask under a nitrogen atmosphere and the solution heated to 55°–65° C. Zirconium n-propoxide (24.3 g, 19.55% Zr, 0.0521 mole), purchased from Huls America Inc., Piscataway, N.J., was added drop-wise over about 15 mins. while agitating the reaction mixture. Ammonium hydroxide solution (42.7 g, 30% $NH_4OH$, 0.7329 mole) was added drop-wise to the pasty, white slurry at 55° to 65° C. over about 15 minutes. The mixture was allowed to agitate for about 30 minutes to give a clear bright yellow solution. Tyzor®-LA (253.1 g, 0.439 mole) was added and the resulting solution allowed to agitate at 50° C. for about 30 minutes. Neodymium nitrate solution (156.8 g, 28.35% $Nd_2O_3$, 0.1321 mole), purchased from Rhone-Poulenc, Princeton, N.J., was added and the resulting solution allowed to agitate at 45° C. for about 15 minutes. Cerium nitrate solution (0.83 g, 27.77% $CeO_2$, 0.0013 mole) was added and the violet to purple solution warmed to 80°–85° C.

Using a procedure similar to that described in Example 1, the solution of chelated metals described above was allowed to react with a hot (80° to 85° C.) solution of 24.7 g (0.09458 mole) barium nitrate and 258 g, 87% KOH (4.0 moles) of potassium hydroxide in 1500 ml of de-ionized de-gassed water. An amount (about 6%) of the total available solution of barium nitrate and potassium hydroxide solution was pumped through the jet-mixer in advance of the solution of chelated metals. The remainder of the solution of barium nitrate and potassium nitrate was pumped simultaneously with the hot solution of the chelated metals over about 45 seconds through the jet mixer into 400 ml of de-ionized water containing 5 g of Igepal® CO-890. The slurry was heated under reflux (98° C.) for 8 hours. After cooling to 25° C., the light blue slurry was filtered and washed with 37 liters of de-ionized water. The filter cake was dried in a vacuum oven (120° C.) and ground to give 107.7 g of light blue powder with a surface area of 309.8 $M^2/g$. The composition obtained by ICP analysis was 37.78% $Nd_2O_3$, 9.84% BaO, 29.53% $TiO_2$, 5.48% $ZrO_2$, 0.618% $CeO_2$, and <0.01% $K_2O$. The ignition loss was 10.57%.

The precipitated powder was calcined at 1000° C. for 5 hours and then was made into capacitors by a method similar to that described in Example 1, except that a phosphate ester surfactant was used (0.5% of the powder weight) in the slurry instead of the AB1015 surfactant. Also, the capacitors had 8 active layers instead of 5. Average capacitance was 1091 pF, dissipation factor was 0.007%, and the calculated dielectric constant was 72. TCC was between +94.9 and +97.5 ppm per °C. from −55° to 125° C., i.e. much more positive than allowed for COG capacitors. It was concluded that incorporation of the zirconium oxide in the composition by co-precipitation had increased its effectiveness and led to over adjustment of the TCC. Insulation resistance averaged 10,500 at 25° C. and 400 ohm.farads at 125° C., well within COG requirements.

EXAMPLE 6

A co-precipitated powder was made with the following nominal composition by weight: 45.12% $Nd_2O_3$, 14.30% BaO, 38.18% $TiO_2$, 2.17% $ZrO_2$, and 0.23% $CeO_2$. The composition in moles is included in Table 1. The powder was made in the following manner. Glacial acetic acid (400 g, 6.660 moles) and 662.6 g (6.252 moles) of 85% lactic acid were charged to a 5 liter flask under a nitrogen atmosphere and the solution heated to 55° to 65° C. Zirconium n-propoxide (486.2 g, 19.55% Zr, 1.042 moles) was added drop-wise at 55° to 65° C. over about 30 minutes while agitating the reaction mixture. Ammonium hydroxide solution (846.2 g, 30% $NH_4OH$, 14.66 moles) was added drop-wise to the white pasty slurry at 55° to 65° C. over about 30 minutes. The mixture was allowed to agitate for about 30 minutes. The resulting solution (2387.1 g) was clarified through Super Cel (filter aid) to give 2210.4 g of a clear light yellow solution of the chelated zirconium. The solution was shown by ICP analysis to contain 4.37% Zr. A portion of the chelated zirconium (36.3 g, 0.01737 mole) was added to 273.3 g (0.4706 mole) of Tyzor®-LA in a 1 liter round-bottom flask under a nitrogen atmosphere. Neodymium nitrate solution (156.8 g, 28.35% $Nd_2O_3$, 0.1321 mole) was added to the charge, followed by 0.825 g, 27.77% $CeO_2$, (0.00134 mole) cerium nitrate solution. The resulting violet to purple solution was warmed at 80° to 85° C.

Using the procedure described in Example 1, the solution of the chelated titanium, zirconium, neodymium and cerium was allowed to react with a hot (80° to 85° C.) solution of 24.7 g (0.09458 mole) of barium nitrate and 258 g, 87% KOH (4.0 moles) of potassium hydroxide in 1500 ml of de-ionized and de-gassed water. An amount (about 7%) of the total available solution of potassium hydroxide and barium nitrate was pumped through the jet-mixer in advance of the solution of chelated metals.

The remainder of the solution of potassium hydroxide and barium nitrate was pumped simultaneously with the hot solution of the chelated metals over about 1 minute through the jet mixer into 400 g of de-ionized water containing 5 g of Igepal® CO-890. The light blue slurry was heated under reflux (96° C.) for 8 hours. After cooling to 25° C., the light blue slurry was filtered and the cake washed with 40 liters of de-ionized water. The filtered cake was dried in a vacuum oven at 120° C. and ground to give 104.5 g of a light blue powder with surface area of 271.8 $M^2/g$. The composition obtained by ICP analysis (by weight) was 36.50% $Nd_2O_3$, 34.10% $TiO_2$, 1.86% $ZrO_2$, 0.274% $CeO_2$ and 0.023% $K_2O$. BaO was not determined.

Capacitors were made as in Example 5 except that this co-precipitated powder with a lower zirconium level was used and the MLC's had 5 active layers instead of 8. Capacitance was 761 pF, dissipation factor was 0.019% and the calculated dielectric constant was 80. TCC was better than −20.8 ppm per °C. from −55° to 125° C., i.e. within the COG requirements. Insulation resistance was 1700 ohm.farads at 25° C. and 290 ohm.farads at 125° C., within the requirements for COG capacitors.

TABLE 1

| Example | Mole % | | | | | |
|---|---|---|---|---|---|---|
| | BaO | $Nd_2O_3$ | $TiO_2$ | $ZrO_2$ | $CeO_2$ | $MnO_2$ |
| 1 | 14.16 | 17.94 | 67.90 | — | — | — |
| 2 | 11.54 | 19.25 | 69.21 | — | — | — |
| 3 | 11.44 | 19.09 | 61.67 | 7.54 | — | 0.26 |
| 4 | 12.80 | 18.43 | 61.30 | 7.28 | 0.19 | — |
| 5 | 12.87 | 18.52 | 61.11 | 7.30 | 0.20 | — |
| 6 | 12.87 | 18.52 | 65.98 | 2.44 | 0.20 | — |

We claim:

1. A composition of a COG densified dielectric body, composition consisting essentially of:
   (a) 60.0–70.0 mol % $TiO_2$;
   (b) 14.3–20.0 mol % $Nd_2O_3$;
   (c) 11.0–16.7 mol % BaO;
   (d) 1.0–8.0 mol % $ZrO_2$; and
   (e) 0.05–0.30 mol % $CeO_2$.

2. The composition of claim 1 wherein (a) through (e) are chemically co-precipitated then calcined to form the composition.

3. The composition of claim 2 consisting essentially of:
   (a) 64.0–67.0 mol % $TiO_2$;
   (b) 18.0–19.0 mole % $Nd_2O_3$;
   (c) 12.8–13.0 mol % BaO;
   (d) 1.5–3.0 mol % $ZrO_2$; and
   (e) 0.15–0.25 mol % $CeO_2$.

4. The composition of claim 1 further comprising an organic medium containing a solution of volatile organic solvent and organic polymeric binder.

5. A dielectric sheet comprising a cast layer of the composition of claim 4 which has been heated to remove volatile organic medium.

6. A dielectric ceramic layer comprising the sheet of claim 5 which has been fired to volatilize the organic medium therefrom and to densify the inorganic components by sintering.

7. A capacitor comprising a plurality of the dielectric ceramic layers of claim 6, and at least two metal electrodes which are separated from each other by at least one said dielectric ceramic layer, the assemblage having been fired at a temperature above 1240° C. to volatilize organic medium, densify the inorganic materials in the dielectric sheets and sinter the metal electrodes.

* * * * *